US011080360B2

(12) United States Patent
Yanagisawa

(10) Patent No.: US 11,080,360 B2
(45) Date of Patent: Aug. 3, 2021

(54) TRANSFORMATION FROM GENERAL MAX SAT TO MAX 2SAT

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 862 days.

(21) Appl. No.: 14/982,001

(22) Filed: Dec. 29, 2015

(65) Prior Publication Data

US 2017/0185565 A1 Jun. 29, 2017

(51) Int. Cl.
*G06F 17/10* (2006.01)
*G06F 17/11* (2006.01)

(52) U.S. Cl.
CPC .................................. *G06F 17/11* (2013.01)

(58) Field of Classification Search
CPC ....................................................... G06F 17/11
USPC ............................................................. 703/2
See application file for complete search history.

(56) References Cited

U.S. PATENT DOCUMENTS

| 2010/0306308 | A1* | 12/2010 | Andraus | G06F 9/5027 709/203 |
| 2014/0237439 | A1 | 8/2014 | Safarpour et al. | |
| 2015/0040107 | A1 | 2/2015 | Iyer | |
| 2015/0186505 | A1 | 7/2015 | Janssen | |

OTHER PUBLICATIONS

Chu Min Li (New Inference Rules for MAX SAT, 2007 (40 pages)).*
Ryan Williams (Maximum 2-satisflability (2004), 7 pages).*
De Klerk et al. (Semidefinite Programming Approaches for Max-2-SAT and MAX-3-SAT Computational Perspectives, (17 pages) (Year: 2002).*
Ryan Williams, A new algorithm for optimal constraint satisfaction and its implications. Theor. Comput. Sci. 348(2-3): 357-365 (2005).
Martin Fürer, Exact Max 2-Sat: Easier and Faster, Pennsylvania State University, Department of Computer Science and Engineering, College of Engineering, 2006.
Panagiotis Manolios, Pseudo-Boolean Solving by Incremental Translation to Sat, in Formal Methods in Computer-Aided Design (FMCAD), 2011, vol., no., pp. 41-45, Oct. 30, 2011-Nov. 2, 2011.
Luca Trevisan, Gadgets, Approximation, and Linear Programming, in Foundations of Computer Science, 1996. Proceedings., 37th Annual Symposium, pp. 617-626, Oct. 14-16, 1996.
Niklas Eén, Translating Pseudo-Boolean Constraints into SAT, Journal on Satisability, Boolean Modeling and Computation 2 (2006) 1-26.

(Continued)

*Primary Examiner* — Andre Pierre Louis
(74) *Attorney, Agent, or Firm* — Tutunjian & Bitetto, P.C.; Randall Bluestone

(57) ABSTRACT

A computer-implemented method for solving a MAX SAT instance in provided in which a MAX SAT instance is transformed into a MAX 3SAT instance. The MAX 3SAT instance is transformed into a MAX 2SAT instance which is solved for an optimum solution. A solution to the MAX SAT instance is recovered from the MAX 2SAT optimum solution.

18 Claims, 6 Drawing Sheets

(56) References Cited

OTHER PUBLICATIONS

Toshihide Ibaraki, Efficient Branch-and-Bound Algorithms for Weighted MAX-2-SAT, Mathematical Programming Apr. 2011, vol. 127, Issue 2, pp. 297-343 (2011).

Jessica Davies, Solving MAXSAT by Solving a Sequence of Simpler SAT Instances, Programming—CP 2011—17th International Conference, CP 2011, pp. 225-239, Perugia, Italy, Sep. 12-16, 2011.

Mohamed El Bachir Menai, A Taxonomy of Exact Methods for Partial Max-SAT, Journal of Computer Science and Technology 28(2): 232{246 Mar. 2013.

* cited by examiner

TRANSFORMATION FROM GENERAL MAX SAT TO MAX 2SAT

BACKGROUND

Technical Field

The present invention generally relates to maximizing the solution to the maximum satisfiability problem (MAX SAT) in a computer implemented method and system.

Description of the Related Art

The Boolean Satisfiability Problem, abbreviated as "SAT", is answered by finding an interpretation that satisfies a given Boolean formula. The problem asks whether the variables of a given Boolean formula can be consistently replaced by the values TRUE or FALSE so that the formula evaluates to TRUE. MAX SAT is an optimization version of SAT that is defined in formulas expressed in Conjunctive Normal Form (CNF). Whereas SAT tries to determine whether or not a satisfying assignment exists, MAX SAT tries to find an assignment that maximizes the satisfaction of the formula.

MAX SAT is one of the general combinatorial optimization problems encountered in computer science. MAX SAT problems present themselves in a number of different fields, including software engineering, formal verification, and bioinformatics.

In a form of MAX SAT, each clause of the CNF formula is given a weight, and an attempt is made to find an assignment that maximizes the sum of the weights of the clauses that are satisfied (or equivalently, find an assignment that minimizes the weight of the clauses that are falsified).

SUMMARY

Described herein according to present principles is a computer-implemented method for solving a MAX SAT instance. The MAX SAT instance is a set of clauses including Boolean variables and their negations (e.g., literals) that are connected by disjunctions. The MAX SAT instance is transformed into a MAX 2SAT instance, by first transforming the clauses of the MAX SAT instance into sets of clauses of at most 3 variables. The MAX 3SAT instance is then transformed into a MAX 2SAT instance by converting the clauses in MAX 3SAT into sets of clauses of at most 2 variables. The MAX 2SAT instance is solved to obtain an optimum solution S*. An optimum solution of the MAX SAT instance is recovered from S*, the MAX 2SAT optimum solution.

Also described herein according to present principles is a system for solving a MAX SAT instance in a computing environment having one or more processors including memory, in which a MAX SAT instance is stored. The system includes components or modules, which also may be in memory, that transform the MAX SAT instance into a MAX 3SAT instance by converting clauses of the MAX SAT instance into sets of clauses of at most 3 variables. A component transforms the MAX 3SAT instance into a MAX 2SAT instance by converting clauses of the MAX 3SAT instance into sets of clauses of at most 2 variables. Further, the system solves the MAX 2SAT instance to provide an optimum solution S* to the MAX 2SAT instance. A MAX SAT instance solution recovery component recovers a solution to the MAX SAT instance from the optimum solution to the MAX 2SAT instance.

Still further in accordance with present principles, described is a computer program product for solving a MAX SAT instance, the computer program product comprising a non-transitory computer readable storage medium having program instructions embodied therewith. The computer-executable program instructions cause the computer to perform a method that includes transforming a MAX SAT instance into a MAX 2SAT instance, by first transforming the MAX SAT instance into a MAX 3SAT instance and then transforming the MAX 3SAT instance into a MAX 2SAT instance. The instructions direct the solving of the MAX 2SAT instance to obtain an optimum solution S*. The instructions further direct the finding of an optimum solution of the MAX SAT instance by recovery of same from S*, the MAX 2SAT optimum solution.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Certain SAT problems cannot be satisfied because regardless of the truth values assigned, at least one clause will be false. An example is a conjunctive normal form formula expressed as:

$$(x_0 \vee x_1) \wedge (x_0 \vee \neg x_1) \wedge (\neg x_0 \vee x_1) \wedge (\neg x_0 \vee \neg x_1).$$

This formula cannot be satisfied because regardless of the truth values assigned to the variables $x_0$ and $x_1$, at least one (1) of the four (4) clauses will be false. As an example of solving the MAX SAT problem, truth values can be assigned to make three (3) of the four (4) clauses be true, and thus the MAX SAT solution is three (3).

MAX SAT can be viewed as a problem of n binary variables and m clauses, given in conjunctive normal form (CNF) expressions, where each binary variable takes one of the values TRUE and FALSE; each clause includes a disjunction of literal terms, e.g., variable $x_i$ or its negation $\neg x_i$; and each clause includes a weight value. Conjunctions may link the clauses. Also, a weighted variation of the problem can be formulated. For example, the values of the clauses can be assigned to maximize the sum of the weights of the clauses that are satisfied. For example, where $(x_1 \lor \neg x_2 \lor x_3, 3)$ $(x_2 \lor x_3, 2)$ $(\neg x_1 \lor \neg x_3, 1)$ $(x_3, 1)$ The first clause, with a weight of three (3), is satisfied when one of the variables satisfies $x_1$=TRUE, $x_2$=FALSE and $x_3$=TRUE. When $x_1$, $x_2$ and $x_3$ are TRUE, TRUE, FALSE, then the first three (3) clauses are satisfied and the assigned values of the weights are 3+2+4=9.

According to present principles the MAX SAT problem is solved with a computer implemented method and system. According to these principles, a given MAX SAT instance having n variables is transformed into an equivalent MAX 2SAT instance having n' variables, wherein n'>n. An optimum solution S* for the MAX 2SAT instance is determined, and from optimum solution S* of the MAX 2SAT instance, an optimum solution from the original MAX SAT instance is recovered.

In one embodiment according to present principles, the MAX SAT instance undergoes an initial transformation to a MAX 3SAT problem, and the MAX 3SAT problem is transformed to a MAX 2SAT problem, from which the optimum solution S* is obtained. To solve MAX SAT, the optimum solution for MAX SAT is recovered from optimum solution S* for MAX 2SAT. Recovery is made by removing the slack variables added during the transformation from MAX SAT to MAX 2SAT.

In the MAX 2SAT problem, the clauses are restricted to have at most 2 literals. This is referred to as 2-satisfiability. In the MAX 3SAT problem, the clauses are restricted to have at most 3 literals. This is referred to as 3-satisfiability.

According to present principles, the transformation from general MAX SAT to MAX 2SAT is computer implemented. For example, the transformation can occur in a computing environment having one or more pressers and memory.

Figure 1:
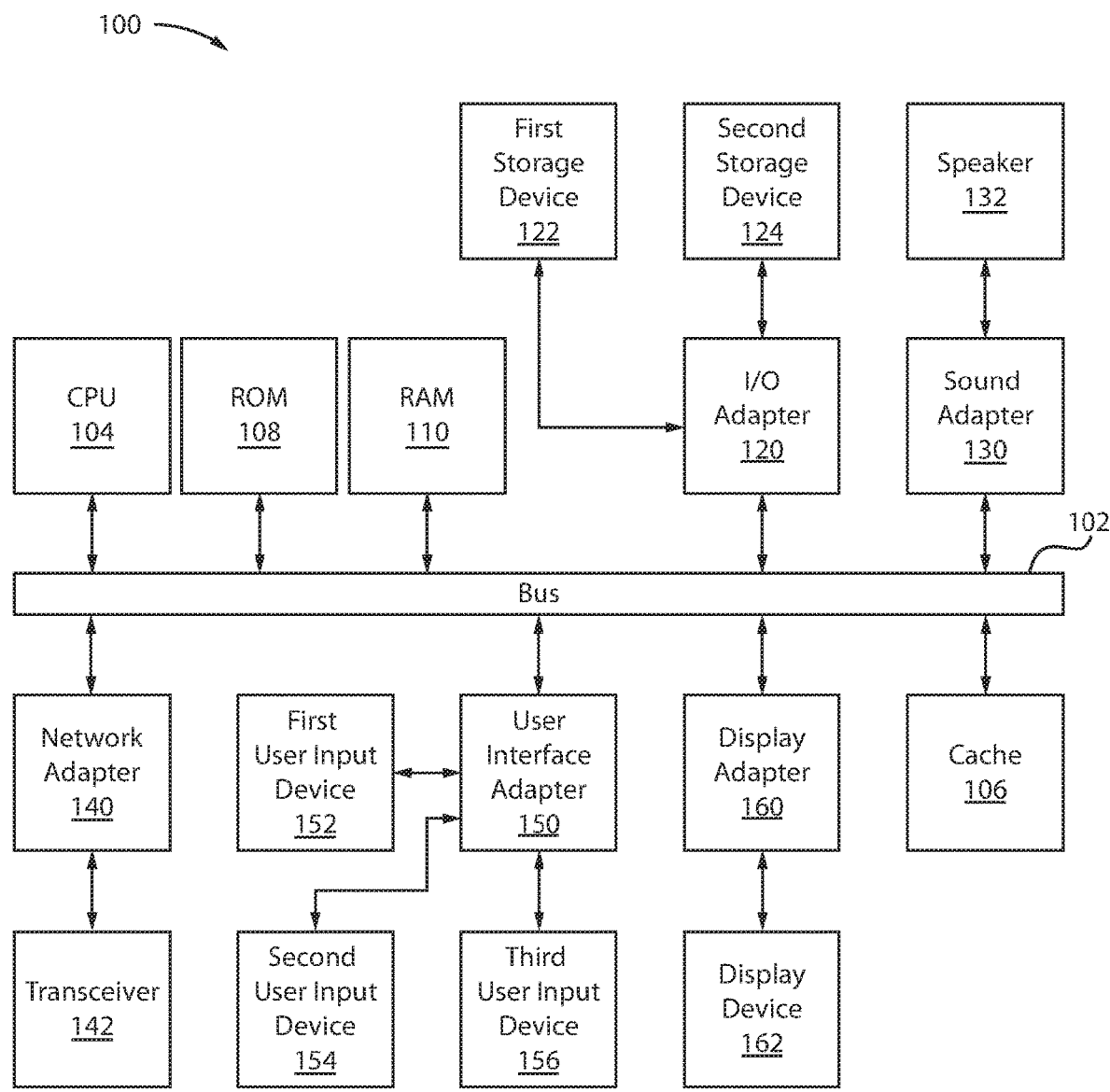
FIG. 1 shows an exemplary processing system for the transforming of MAX SAT to MAX 2SAT in a computing environment in accordance with an embodiment of the present principles.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
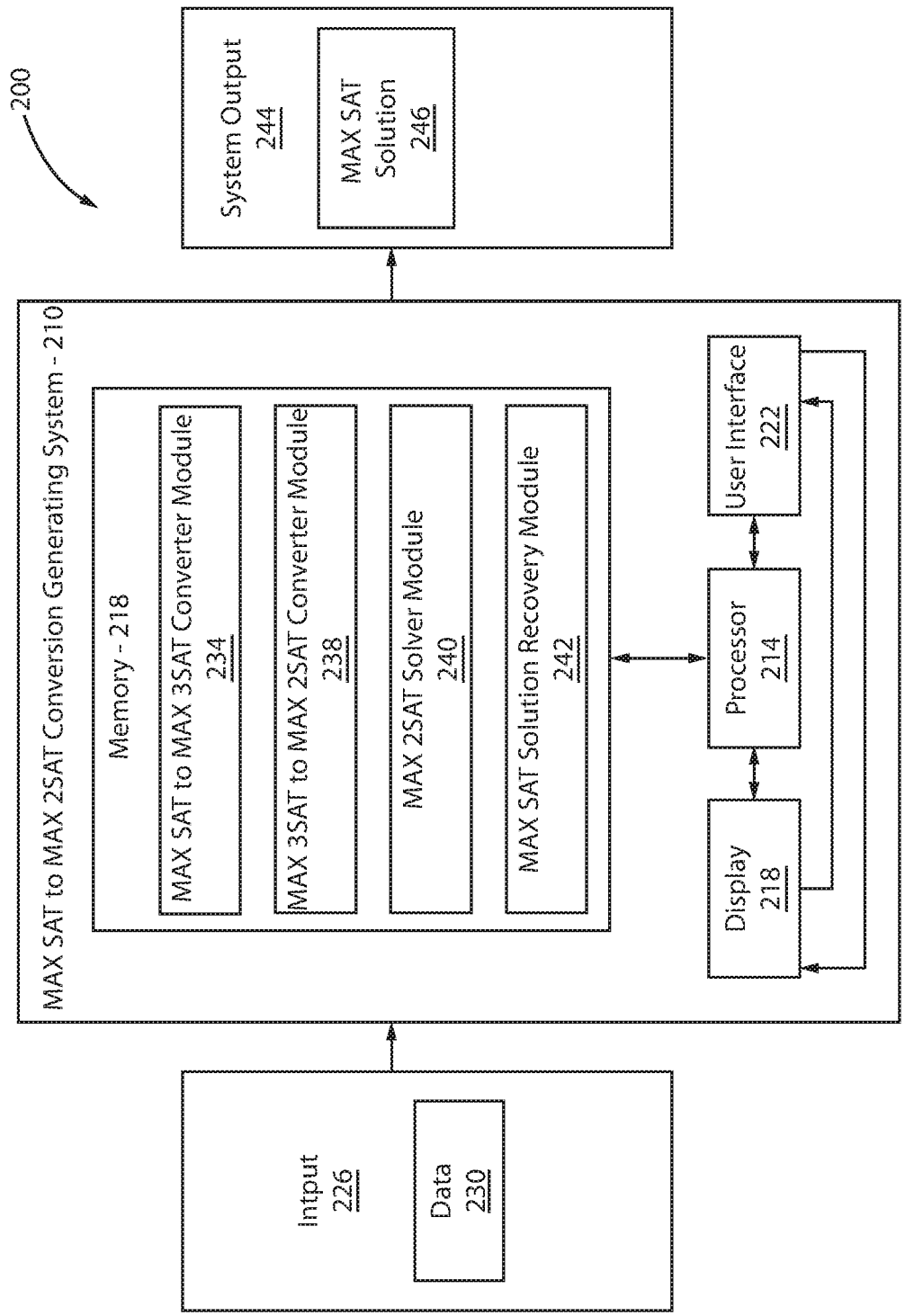
FIG. 2 shows, with added detail, an exemplary processing system for the transforming of MAX SAT to MAX 2SAT in a computing environment in accordance with an embodiment of the present principles.

Referring to FIG. 2, system 200 for implementing respective embodiments of the present principles is shown. Part or all of processing system 100 may be implemented in one or more of the elements of system 200.

System 200 is an exemplary system for solving MAX SAT through the transforming from general MAX SAT to MAX 2SAT, in accordance with an embodiment of the present principles. It is to be appreciated that the system may perform at least part of the method described herein including, for example, at least part of method 300 of FIG. 3.

System 200 preferably includes a MAX SAT to MAX 2SAT conversion generating system 210 ("conversion generating system") that includes one or more processors 214 and memory 218 for storing applications, modules and other data. The system 200 may also include one or more displays 220 for viewing. The display 220 may permit a user to interact with the system and its components and functions. This may be facilitated by the inclusion of a user interface 222, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 200 is depicted as a computer implemented approach to solving MAX SAT instance by transforming same into a MAX 2SAT instance, from which MAX SAT solutions are recovered. The system 200 receives input 226, which may include data 230 in the form of a MAX SAT instance that is to be transformed into MAX 2SAT instance. MAX SAT instance may be stored in the memory unit of the conversion generating system 210. The input data may include clauses constructed of binary variables, disjunctions of literal terms (e.g., variables) and clauses. The data may be presented in a formula in conjunctive normal form, with assigned weight values for the clauses, which taken together define a MAX SAT instance presented as data to the system for solution.

Input is received by MAX SAT to MAX 2SAT conversion generating system 210 ("conversion generating system"). Conversion generating system 210 includes a MAX SAT to MAX 3SAT converter module 234, a MAX 3SAT to MAX 2SAT converter module 238, a MAX 2SAT solver module 240, and MAX SAT solution recovery module 242.

In one embodiment of the present principles, MAX SAT to MAX 3SAT converter module 234, MAX 3SAT to MAX 2SAT converter module 238, MAX 2SAT solver module 240, and MAX SAT solution recovery module 242 of the conversion generating system 210 are configured in the memory unit 218 that operatively communicates with the processor 214.

In converting the MAX SAT instance to a MAX 2SAT instance, the MAX SAT instance data is received by MAX SAT to MAX 3SAT converter module 234. The MAX SAT instance, defined in terms of binary variables and clauses and weight values assigned to the individual clauses of a MAX SAT instance, is converted to a MAX 3SAT instance. For example, for a MAX SAT clause $$(x_1 \vee x_2 \vee \ldots \vee x_k, w)$$

With weight w and length k (the number of literals), and with k≥4, the clause is transformed to MAX 3SAT, having a set of k−2 clauses of length 3 variables using slack variables:

$$(x_1 \vee x_2 \vee y_1, w)$$
$$(\neg y_1 \vee x_3 \vee y_2, w)$$
$$(\neg y_2 \vee x_2 \vee y_3, w)$$
$$(\neg y_{k-4} \vee x_{k-2} \vee y_{k-3}, w)$$
$$(\neg y_{k-3} \vee x_{k-1} \vee x_k, w)$$

Where $y_1 \ldots, y_{k-3}$ are slack variables. This transformation would occur for each clause of the MAX SAT instance. Each clause in MAX SAT is transformed into a set of 3-clauses, as described herein. In this embodiment, a clause that consists of exactly k variables is referred to as a k-clause.

In one embodiment, in transforming from MAX SAT to MAX 3SAT, the MAX SAT to MAX 3SAT converter module 234 is configured to transform a clause of k variables into a set of k−2 clauses of length 3 variables. In one other embodiment, the MAX SAT to MAX 3SAT converter module 234 is configured to transform a clause of k variables into a set of k−2 clauses of length 3 variables that include slack variables. In one other embodiment, the MAX SAT to MAX 3SAT converter module 234 is configured to maintain the weight values w of the clauses in the corresponding clauses created in the transformation to MAX 3 SAT. Each clause in MAX SAT is transformed into a set of 3-clauses as described herein.

In converting the MAX 3SAT instance to a MAX 2SAT instance, the MAX 3SAT instance data is received by the MAX 3SAT to MAX 2SAT converter module 238, where MAX 3SAT is transformed to MAX 2SAT. For example, for a given clause $$(x_1 \vee x_2 \vee x_3, w)$$

Having a length of 3 variables and weight w, the clause is transformed into five clauses of at most length 2 variables. The generated clauses may include slack variables:

$$(\neg x_1 \vee \neg x_3, w)$$
$$(x_1 \vee \neg y, w)$$
$$(x_2 \vee y, w)$$
$$(x_3 \vee \neg y, w)$$
$$(y, w)$$

Where y is a slack variable. Each clause in MAX 3 SAT is transformed into a set of 2-clauses and a 1-clause, as described herein.

In the system according to present principles, a MAX SAT instance with n variables is transformed into an equivalent MAX 2SAT instance with n' variables, where n'>n. This transformation occurs in the operations performed in modules 234 and 238.

In one embodiment, the MAX 3SAT' to MAX 2SAT' converter module 238 is configured to transform a clause of 3 variables into a set of 5 clauses of at most length 2 variables. In one other embodiment, the MAX 3SAT to MAX 2SAT converter module 238 is configured to transform a clause of 3 variables into a set of 5 clauses of at most length 2 variables that include slack variables. In one other embodiment, the MAX 3SAT to MAX 2SAT converter module 238 is configured to maintain the weight values w of the clauses in the corresponding clauses created in the transformation to MAX 2SAT. Each clause in MAX 3SAT is transformed into a set of 2-clauses and a 1-clause, as described herein.

In MAX 2SAT solver module 240, the solution to the MAX 2SAT instance is obtained. An optimum solution S* is obtained for the MAX 2SAT instance, from which an optimum solution to the original MAX SAT instance can be recovered. Recovery is made by removing the slack variables added during the transformation from MAX SAT to MAX 2SAT.

In one embodiment, the MAX 2SAT solver module 240 is configured to solve the MAX 2SAT instance by performing an algorithm based on one or both of the half integrality property and the persistency properties. Such an algorithm, or algorithms, would run fast and be expected to substantially reduce processing time, as discussed below.

The output 244 of the conversion generating system 210 is the optimal solution 246 to MAX SAT.

Figure 3:
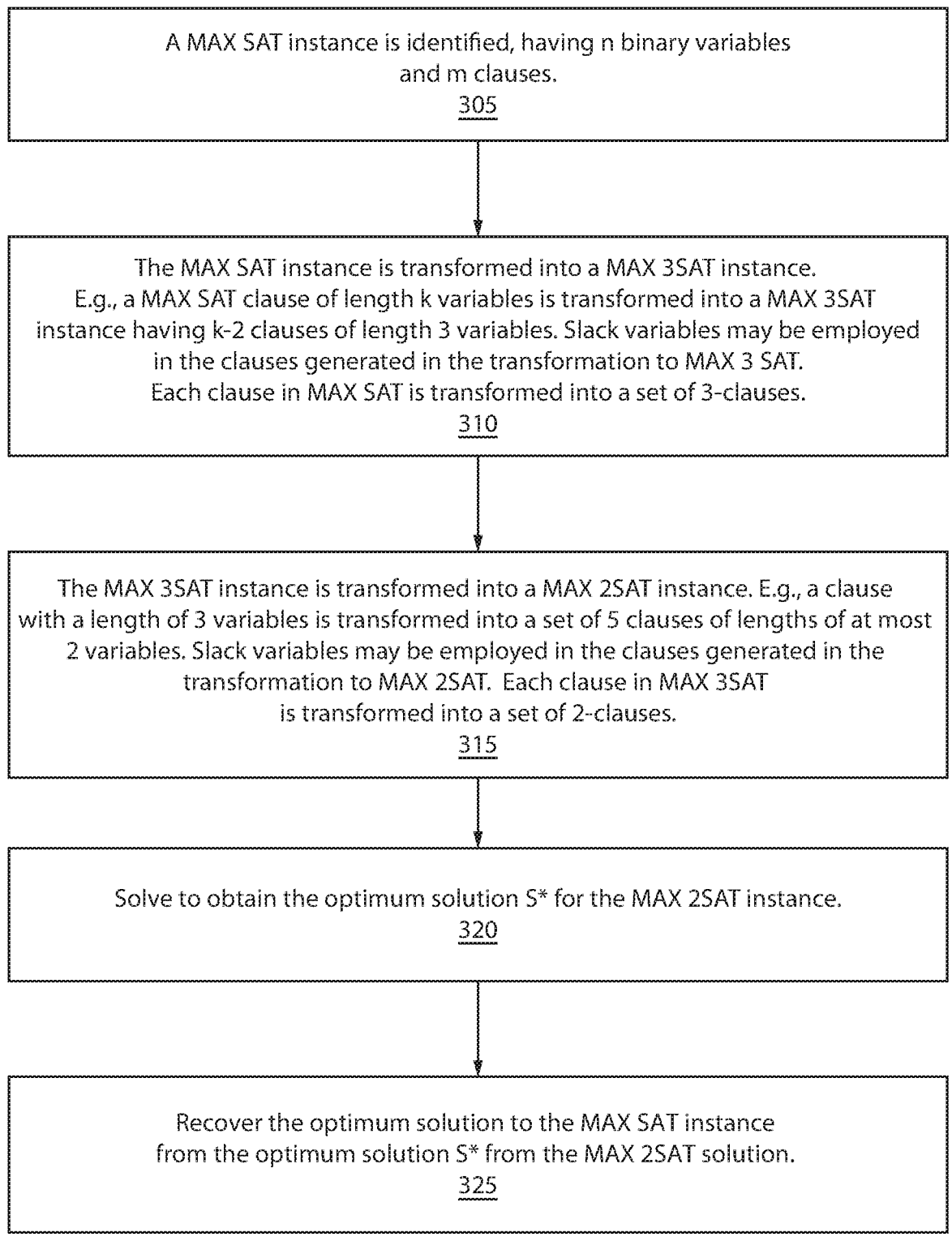
FIG. 3 shows an exemplary method of transforming MAX SAT to MAX 2SAT in accordance with an embodiment of the present principles.

Referring to FIG. 3, an exemplary method 300 for transforming from general MAX SAT to MAX 2SAT, in accordance with an embodiment of the present principles, is shown.

In block 305, a MAX SAT instance is identified, having n binary variables and m clauses.

In block 310, the MAX SAT instance is transformed into a MAX 3SAT instance. For example, a clause of length k variables is transformed into a MAX 3SAT instance having k−2 clauses of length 3 variables. Slack variables may be employed in the clauses generated in the transformation to MAX 3SAT. Each clause in MAX SAT is transformed into a set of 3-clauses, as described herein.

In block 315, the MAX 3SAT instance is transformed into a MAX 2SAT instance. For example, a clause with a length of 3 variables is transformed into a set of 5 clauses of lengths of at most 2 variables. Slack variables may be employed in the clauses generated in the transformation to MAX 2SAT. Each clause in MAX 3SAT is transformed into a set of 2-clauses and a 1-clause, as described herein.

In block 320, the MAX 2SAT instance is solved to obtain the optimum solution S*.

In block 325, the optimum solution to the MAX SAT instance is recovered from the optimal solution S* from the MAX 2SAT determination.

The finding of an optimum solution to a MAX SAT instance according to present principles can be demonstrated as follows. In the MAX SAT to MAX 3SAT transformation, if at least one of the variables $x_1, x_2, \ldots, x_k$ are TRUE, then appropriate values can be assigned to slack variables $y_1 \ldots y_{k-3}$ so that all k−2 clauses of the MAX 3SAT instance are satisfied.

On the other hand, if all of the variables $x_1, x_2, \ldots, x_k$ are FALSE, then at most k−2 clauses of the MAX 3SAT instance can be satisfied by any of the assignments given to slack variables $y_1 \ldots y_{k-3}$.

Thus, the difference in the objective values of the satisfiable clauses and unsatisfiable clauses remains the weight value w, even when transformed from MAX SAT to MAX 3SAT.

In transforming from MAX 3SAT to MAX 2SAT, if at least one of the variables $x_1$, $x_2$, $x_3$ is TRUE, then an appropriate value for slack variable y can be found that satisfies 4 out of the 5 generated clauses.

On the other hand, if all of the variables $x_1$, $x_2$, $x_3$ are FALSE, then 2 out of the 5 generated clauses are unsatisfied for every assignment that variable y is given.

Thus, the difference in the objective values between the satisfiable and unsatisfiable clauses remains weight value w, even when transformed from MAX 3SAT to MAX 2SAT.

There are several advantages the flow from solving MAX SAT in accordance with the present principles over conventional solutions, such as, for example:

Transforming a general MAX SAT problem into a MAX 2SAT problem as described allows for solving the problem with a faster algorithm. According to present principles, a general MAX SAT instance is transformed into a special MAX 2SAT instance and a faster MAX 2SAT algorithm is used to solve the problem. A MAX 2SAT problem with n variables can be solved in $O(1.74^n)$ time, in contrast to a MAX SAT problem with n variables, which requires $O(2^n)$ time to solve according to the strong exponential time hypothesis. This significantly reduces the processing time required to obtain solutions to the MAX SAT problem, than if the MAX SAT problem was solved directly, such as without transformation in accordance with present principles.

Solving MAX 2SAT presents advantages over solving MAX SAT directly, due to certain properties that exist in MAX 2SAT but not MAX SAT. A MAX SAT instance with n variables $x_1, x_2, \ldots, x_n$ can be formulated as an integer programming by regarding $x_i=1$ as assigned $x_i$=TRUE and $x_i=0$ as assigned $x_i$=FALSE. It is known that each of the variables in an optimum corner solution of the linear relaxation of the integer programming that is created from MAX 2SAT takes one of the values $\{0, \frac{1}{2}, 1\}$, also known as the half integrality property.

Furthermore, if $x_i$=TRUE can be safely assigned if $x_i=1$ and $x_i$=FALSE can be safely assigned if $x_i=0$, then a reduced equivalent MAX 2SAT instance can be obtained with only a set of variables such that $x_i=\frac{1}{2}$. This is known as the persistency property.

The half integrality and persistency properties of MAX 2SAT allow for the reduction of polynomial time and as a result, algorithm processing can be accelerated. Still further, a MAX 2SAT instance can be represented using a graph, with a MAX 2SAT instance with n variables being presented as a direct graph with n nodes. This is possible because the clause length in MAX SAT is, at most, 2. On the other hand MAX SAT does not have these properties. The direct graph presentation of the MAX 2SAT instance enables the constructing of a fast heuristic algorithm using graph theory.

In MAX SAT instances known as "almost" MAX 2SAT, the present principles are well suited for problem solving. In "almost" MAX 2SAT, the lengths of most clauses are at most 2, with a small number of clauses having lengths 3 or longer.

For example, an optimum solution can be obtained for the following MAX 2SAT instance having 23 clauses by using the half integrality and persistency property of MAX 2SAT. (An optimum solution is $x_i$=FALSE for all i and $y_j$=TRUE for all j): $(\overline{x_1}, 1), (\overline{x_2}, 1), (\overline{x_3}\times, 1), (\overline{x_4}, 1), (\overline{x_5}, 1), (\overline{y_3}, 1), (\overline{y_2}, 1), (\overline{y_3}, 1), (x_1 \vee y_1, 100), (x_1 \vee y_2, 100), (x_1 \vee y_3, 100), (x_2 \vee y_1, 100), (x_2 \vee y_2, 100), (x_2 \vee y_3, 100), (x_3 \vee y_1, 100),$ $(x_3 \vee y_2, 100), (x_3 \vee y_3, 100), (x_4 \vee y_1, 100), (x_4 \vee y_2, 100), (x_4 \vee y_3, 100), (x_5 \vee y_1, 100), (x_5 \vee y_2, 100), (x_5 \vee y_3, 100).$ If another clause $(y_1 \vee y_2 \vee y_3, 1)$ is added to the 23 clauses, then the problem becomes a MAX 3SAT instance and as such the half integrality and persistency properties cannot be utilized in reaching a solution. By adding the one clause, the use of an effective algorithm for MAX 2SAT would be prohibited. If however according to present principles the 24 clause instance is transformed into a MAX 2SAT instance, then the half integrality and persistency properties can be used to solve the problem, allowing for the obtaining of an optimum solution where $x_i$=FALSE for all i and $y_j$=TRUE for all j.

There are numerous real world applications for MAX SAT. For example, MAX SAT is used for model checking, e.g., verification of hardware and software systems. MAX SAT has application to classical planning problems related to automated planning and scheduling of events. MAX SAT is applied to combinatorial design for purposes of optimizing outcomes. Other applications include the design of experimental protocols, coding theory, cryptography, drug design, drug testing, crop rotation schedules, software engineering, and bioinformatics. By way of example, an intelligent agent can be provided with the capability of solving MAX SAT in accordance with present principles.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
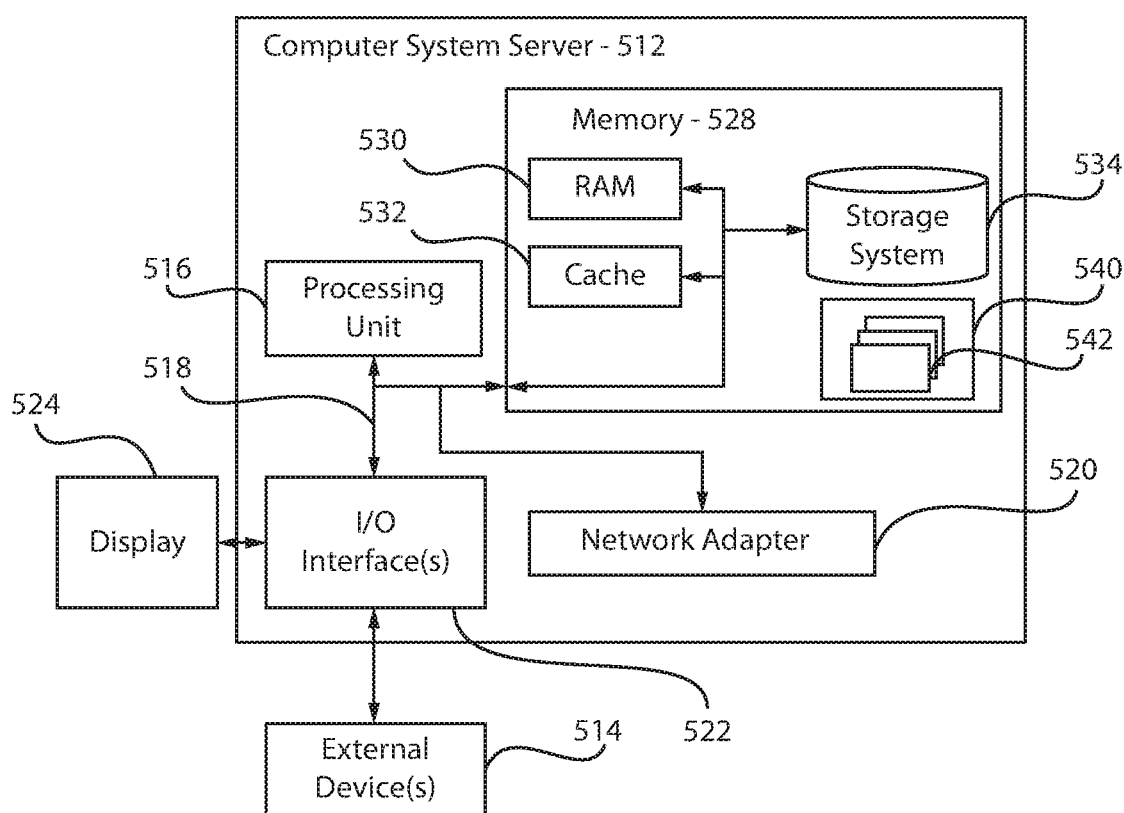
FIG. 4 shows an exemplary cloud computing node in accordance with an embodiment of the present principles.

Referring now to FIG. 4, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture USA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 5:
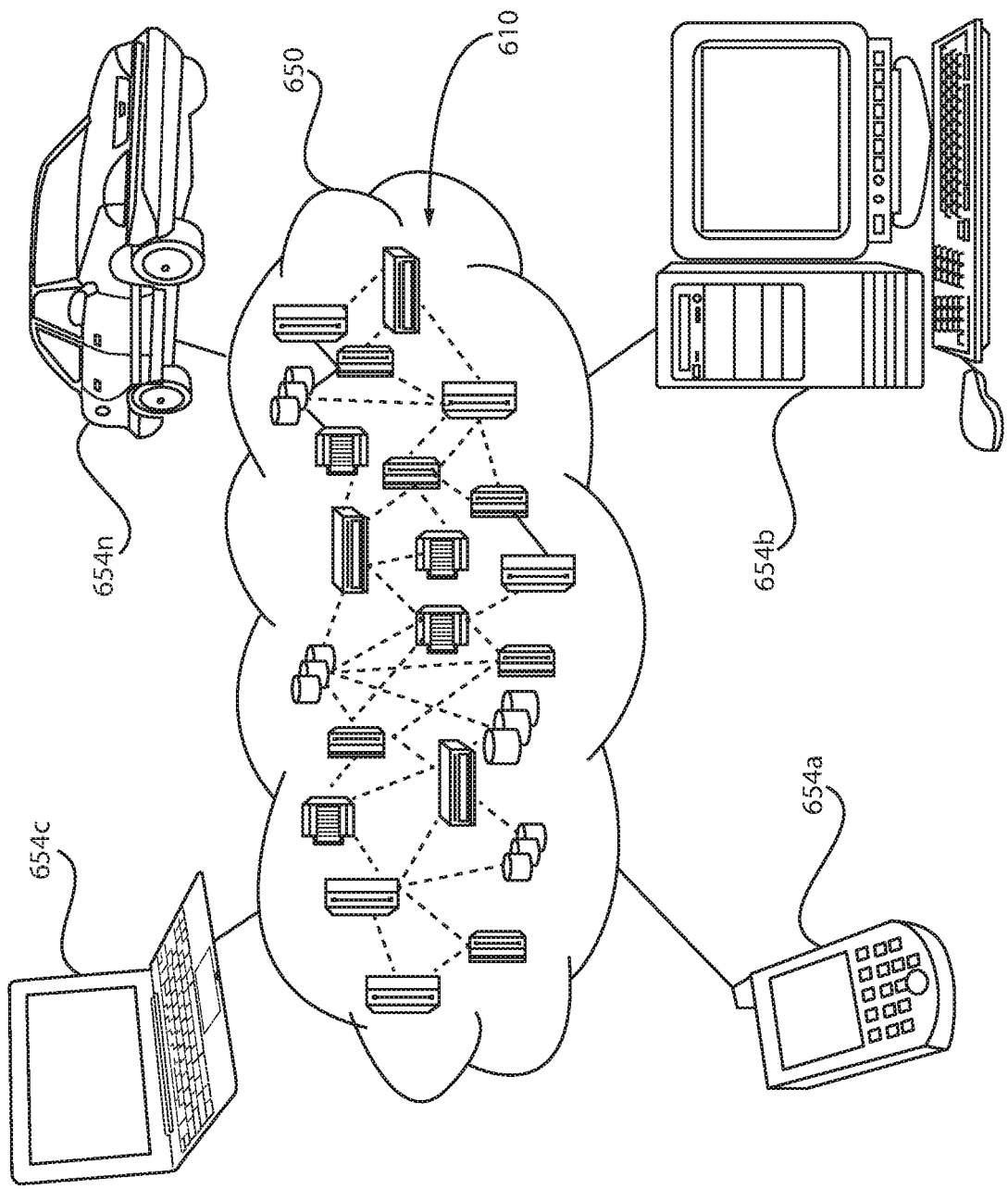
FIG. 5 shows an exemplary cloud computing environment in accordance with an embodiment of the present principles.

Referring now to FIG. 5, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 5 are intended to be illustrative only and that computing nodes 610 and cloud computing environment 650 can communicate with any type of computerized device over any type of network and/or network addressable connection (e.g., using a web browser).

Figure 6:
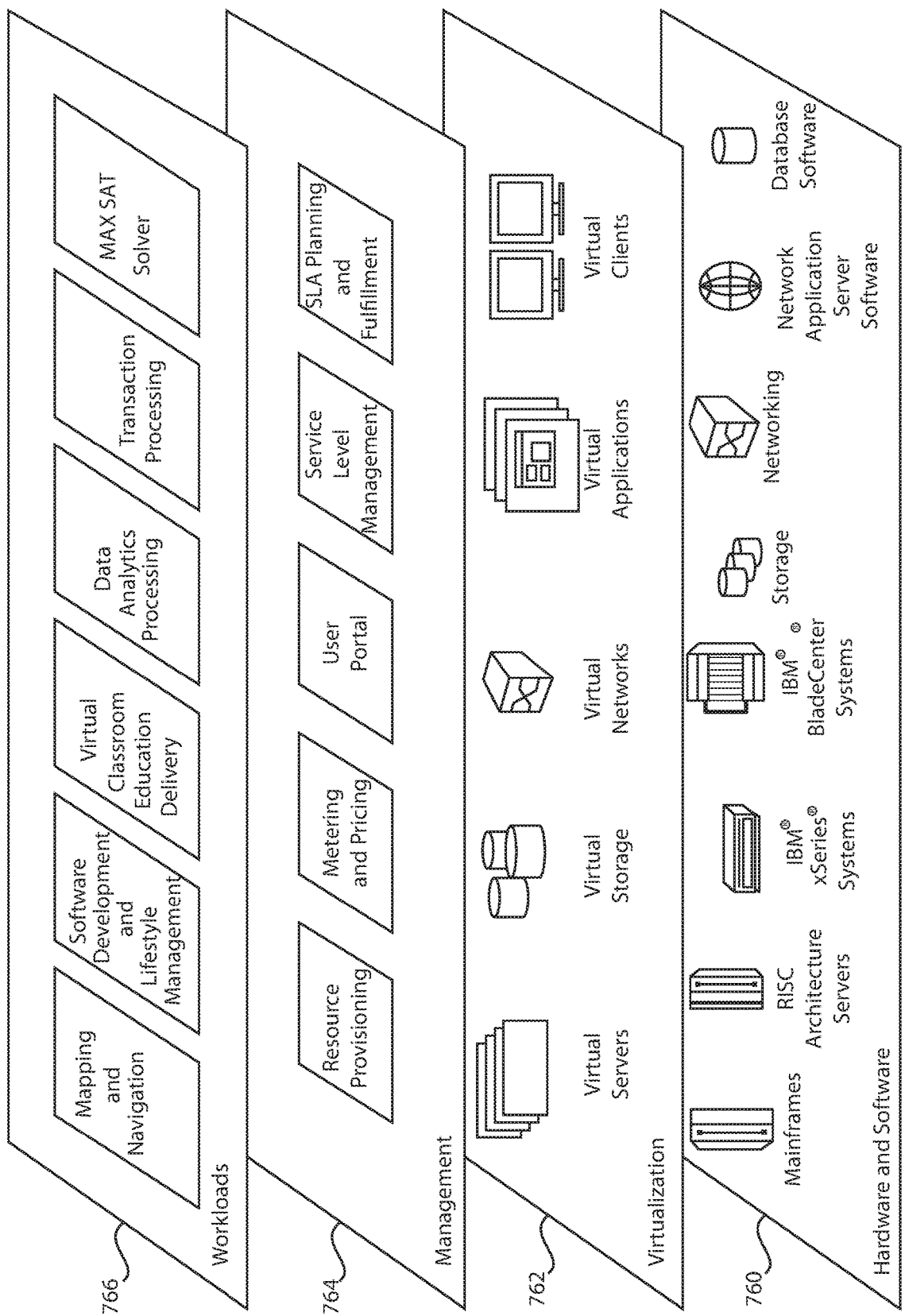
FIG. 6 shows exemplary abstraction model layers, in accordance with an embodiment of the present principles.

FIG. 6 shows a set of functional abstraction layers provided by cloud computing environment 650. It should be understood in advance that the components, layers, and functions shown in FIG. 6 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and MAX SAT solver.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for solving MAX SAT, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reducing processing time and computational resources used by at least one hardware processor to verify at least one component of a computer system, the method comprising:

verifying, by at least one hardware processor operatively coupled to a computer memory, at least one component of a computer system using an optimum solution o a general MAX SAT instance obtained from optimum solution to a MAX 2SAT instance, the general MAX SAT instance being stored in the computer memory and comprising a set of clauses containing Boolean variables connected by disjunctions, wherein verifying the at least one component of the computer system includes obtaining the optimum solution to the general MAX SAT instance from the optimum solution to the MAX 2SAT instance by:

transforming, by at least one hardware processor, the general MAX SAT instance into a MAX 3SAT instance by converting the clauses in MAX SAT into sets of clauses of at most 3 variables;

transforming, by the at least one hardware processor, the MAX 3SAT instance into the MAX 2SAT instance by converting the clauses in MAX 3SAT into sets of clauses of at most 2 variables, the MAX 2SAT instance;

solving, by the at least one hardware processor, the MAX 2SAT instance by obtaining an optimum solution to the MAX 2SAT instance, including performing an algorithm based on half integrality and persistency properties associated with the MAX 2SAT instance; and recovering, by the at least one hardware processor, the optimum solution to the general MAX SAT instance from the optimum solution to the MAX 2SAT instance;

wherein, due at least in part to the performance of the algorithm based on the half integrality and persistency properties, recovering the optimum solution to the general MAX SAT instance from the optimum solution to the MAX 2SAT instance reduces processing time and computational resources used by the at least one hardware processor for verifying the at least one component of the computer system by reducing processing time and computational resources used by the at least one hardware processor for recovering the optimum solution to the general MAX SAT instance when compared to obtaining the optimum solution to the general MAX SAT instance directly from the general MAX SAT instance.

2. The method of claim 1, wherein the general MAX SAT instance has n variables and the MAX 2SAT instance has n' variables, wherein n'>n.

3. The method according to claim 1, wherein the clauses of the general MAX SAT instance are assigned weight values.

4. The method of claim 3, wherein the assigned weight value for each clause of the MAX SAT instance is retained by the clauses generated in transforming same to the MAX 3SAT instance.

5. The method of claim 4, wherein the weight values of the clauses generated in transforming to the MAX 3SAT instance are retained by the clauses generated in transforming same to the MAX 2SAT instance.

6. The method of claim 1, further comprising, in transforming the MAX SAT instance into the MAX 3SAT instance, including slack variables in the MAX 3SAT clauses.

7. The method of claim 1, further comprising, in transforming the MAX 3SAT instance into the MAX 2SAT instance, including slack variables in the MAX 2SAT clauses.

8. The method of claim 1, wherein the recovering of the optimum solution to the MAX SAT instance comprises removing slack variables added to clauses during the transformation from MAX SAT to MAX 2SAT.

9. A system comprising:

memory for storing a general MAX SAT instance comprising a set of clauses containing Boolean variables connected by disjunctions; and one or more hardware processors operatively coupled to the memory and configured to execute program code implementing a method for reducing processing time and computational resources used by the one or more hardware processors to verify at least one component of a computer system, the method comprising:

verifying the at least one component of a computer system using an optimum solution to the general MAX SAT instance obtained from an optimum solution to a MAX 2SAT instance, including obtaining the optimum solution to the general MAX SAT instance from the optimum solution to the MAX 2SAT instance by:

transforming the general MAX SAT instance into a MAX 3SAT instance by converting the clauses in MAX SAT into sets of clauses of at most 3 variables;

transforming the MAX 3SAT instance into the MAX 2SAT instance by converting the clauses in MAX 3SAT into sets of clauses of at most 2 variables, the MAX 2SAT instance;

solving the MAX 2SAT instance by obtaining an optimum solution to the MAX 2SAT instance, including performing an algorithm based on half integrality and persistency properties associated with the MAX 2SAT instance; and recovering the optimum solution to the general MAX SAT instance from the optimum solution to the MAX 2SAT instance;

wherein, due at least in part to the performance of the algorithm based on the half integrality and persistency properties, recovering the optimum solution to the general MAX SAT instance from the optimum solution to the MAX 2SAT instance reduces processing time and computational resources used by the at least one hardware processor for verifying the at least one component of the computer system by reducing processing time and computational resources used by the at least one hardware processor for recovering the optimum solution to the general MAX SAT instance when compared to obtaining the optimum solution to the general MAX SAT instance directly from the general MAX SAT instance.

10. The system of claim 9, wherein, in transforming the MAX SAT instance into the MAX 3SAT instance, the one or more processors are configured to transform MAX SAT clauses of k variables into sets of k−2 clauses of at most length 3 variables.

11. The system of claim 9, wherein, in transforming the MAX SAT instance into the MAX 3SAT instance, the one or more processors are further configured to transform clauses of k variables into sets of k−2 clauses of at most length 3 variables that include slack variables.

12. The system of claim 9, Wherein, in transforming the MAX 3SAT instance into the MAX 2SAT instance, the one or more processors are further configured to transform clauses of 3 variables into sets of 5 clauses of at most length 2 variables.

13. The system of claim 9, wherein, in transforming the MAX 3SAT instance into the MAX 2SAT instance, the one or more processors are further configured to transform clauses of 3 variables into sets of 5 clauses of at most length 2 variables that include slack variables.

14. The system of claim 9, wherein, in providing the optimum solution to the MAX 2SAT instance, the one or more processors are further configured to solve the MAX 2SAT instance by performing an algorithm based on a half integrality property and a persistency property.

15. The system of claim 9, wherein, in recovering the solution to the MAX SAT instance from the optimum solution to the MAX 2SAT instance, the one or more processors are further configured to recover the optimum solution to the MAX SAT instance by removing slack variables added to clauses during the transformation from MAX SAT to MAX 2SAT.

16. A computer program product comprising a non-transitory computer readable storage medium having program instructions embodied therewith, the program instructions being executable by a computer to cause the computer to perform a method for reducing processing time and computational resources used by at least one hardware processor to verity at least one component of a computer system the method comprising:

verifying at least one component of a computer system using an optimum solution to a general MAX SAT instance obtained from an optimum solution to a MAX 2SAT instance, the general MAX SAT instance being stored in a computer memory and comprising a set of clauses containing Boolean variables connected by disjunctions, wherein verifying the at least one component of the computer system includes obtaining the optimum solution to the general MAX SAT instance from the optimum solution to the MAX 2SAT instance by:

transforming the general MAX SAT instance into a MAX 3SAT instance by converting the clauses in MAX SAT into sets of clauses of at most 3 variables;

transforming the MAX 3SAT instance into the MAX 2SAT instance by converting the clauses in MAX 3SAT into sets of clauses of at most 2 variables, the MAX 2SAT instance;

solving the MAX 2SAT instance by obtaining an optimum solution to the MAX 2SAT instance, including performing an algorithm based on half integrality and persistency properties associated with the MAX 2SAT instance; and recovering an optimum solution to the general MAX SAT instance from the optimum solution to the MAX 2SAT instance;

wherein, due at least in part to the performance of the algorithm based on the half integrality and persistency properties, recovering the optimum solution to the general MAX SAT instance from the optimum solution to the MAX 2SAT instance reduces processing time and computational resources used by the at least one hardware processor for verifying the at least one component of the computer system by reducing processing time and computational resources used by the at least one hardware processor for recovering the optimum solution to the general MAX SAT instance when compared to obtaining the optimum solution to the general MAX SAT instance directly from the general MAX SAT instance.

17. The computer program product of claim 16, wherein the method further comprises:

transforming clauses in MAX SAT of k variables into sets of k−2 clauses of length at most 3 variables that include slack variables.

18. The computer program product of claim 16, wherein the method further comprises:

transforming clauses in MAX 3SAT of 3 variables into a set of 5 clauses of at most length 2 variables that include slack variables.

* * * * *